(12) United States Patent
Chen (10) Patent No.: US 12,308,784 B2
(45) Date of Patent: May 20, 2025

(54) EASY-TO-INSTALL SOLAR SURVEILLANCE APPARATUS

(71) Applicant: Macro-Video Technologies Co., LTD., Guangdong (CN)

(72) Inventor: Shaoneng Chen, Guangdong (CN)

( * ) Notice: Subject to any disclaimer, the term of this patent is extended or adjusted under 35 U.S.C. 154(b) by 0 days.

(21) Appl. No.: 17/631,632

(22) PCT Filed: Mar. 26, 2021

(86) PCT No.: PCT/CN2021/083158
§ 371 (c)(1),
(2) Date: Jan. 31, 2022

(87) PCT Pub. No.: WO2022/165950
PCT Pub. Date: Aug. 11, 2022

(65) Prior Publication Data
US 2024/0333199 A1  Oct. 3, 2024

(30) Foreign Application Priority Data

Feb. 5, 2021  (CN) .......................... 202120345482.X (51) Int. Cl.
*H02S 20/22* (2014.01)
*F16M 13/02* (2006.01)
*G03B 17/56* (2021.01)

(52) U.S. Cl.
CPC ........... *H02S 20/22* (2014.12); *F16M 13/022* (2013.01); *G03B 17/561* (2013.01)

(58) Field of Classification Search
CPC ........ H02S 20/22; H02S 50/00; G03B 17/561
See application file for complete search history.

(56) References Cited

U.S. PATENT DOCUMENTS

| 2013/0163976 A1* | 6/2013 | Pierce | G08B 15/001 |
| | | | 396/427 |
| 2023/0122641 A1* | 4/2023 | Zhang | G03B 17/561 |
| | | | 396/427 |

FOREIGN PATENT DOCUMENTS

| CN | 204795417 U | * | 11/2015 | |
| CN | 107733359 A | * | 2/2018 | ............ H02S 50/00 |
| CN | 207460373 U | | 6/2018 | |
| CN | 109027554 A | | 12/2018 | |

(Continued)

OTHER PUBLICATIONS

International Search Report issued in International Application No. PCT/CN2021/083158 dated Oct. 14, 2021.

*Primary Examiner* — Golam Mowla
(74) *Attorney, Agent, or Firm* — Nitin Kaushik (57) ABSTRACT

Provided is an easy-to-install solar surveillance apparatus. The easy-to-install solar surveillance apparatus includes a mount, a camera device and a solar device. The mount is provided with a first locking slot and a second locking slot. The camera device includes a first locking plate, a first holder and a camera. The solar device includes a second locking plate, a second holder and a solar assembly. The first locking plate and the camera are disposed at one end of the first holder and another end of the first holder respectively. The second locking plate and the solar assembly are disposed at one end of the second holder and another end of the second holder respectively. The first locking plate may be inserted into the first locking slot to secure the camera device. The second locking plate may be inserted into the second locking slot to secure the solar device.

20 Claims, 9 Drawing Sheets (56) References Cited

FOREIGN PATENT DOCUMENTS

| CN | 210291229 | U | | 4/2020 | |
|---|---|---|---|---|---|
| CN | 111917961 | A | | 11/2020 | |
| CN | 211908948 | U | | 11/2020 | |
| CN | 211981967 | U | | 11/2020 | |
| CN | 116582083 | A | * | 8/2023 | ............. B08B 1/145 |
| DE | 202021105635 | U1 | * | 12/2021 | ............... B08B 1/00 |
| EP | 4279791 | A1 | * | 11/2023 | ............. F16M 11/10 |
| KR | 960003940 | Y1 | * | 5/1996 | ....... G08B 13/19632 |
| KR | 101895215 | B1 | * | 9/2018 | ............. H02S 50/00 |
| WO | 2009112955 | A2 | | 9/2009 | |

* cited by examiner

FIG. 10

EASY-TO-INSTALL SOLAR SURVEILLANCE APPARATUS

RELATED APPLICATIONS

The subject application is a U.S. National Stage application of International Application No. PCT/CN2021/083158, filed on Mar. 26, 2021, which claims the priority of Chinese Patent Application No. 202120345482.X, filed on Feb. 5, 2021. The contents of which are herein incorporated by reference in their entirety.

This application claims priority to Chinese Patent Application No. 202120345482.X filed with the China National Intellectual Property Administration (CNIPA) on Feb. 5, 2021, the disclosure of which is incorporated herein by reference in its entirety.

TECHNICAL FIELD

The present application relates to the field of security and surveillance technology, for example, an easy-to-install solar surveillance apparatus.

BACKGROUND

Surveillance equipment is widely applied in the field of security and other fields. The equipment is flexible in arrangement and easy to use and can surveil specific areas and provide a guarantee for community safety and even social safety.

To get rid of the dependence on a line, some existing surveillance equipment is provided with a battery or a solar battery panel. A video signal is also transmitted through wireless transmission. Therefore, the surveillance equipment can be installed at almost any required position. However, such surveillance equipment also has a large volume and a heavy weight and is generally installed in a manner of one-time integral fixation during installation. Therefore, the installation process is time-consuming and laborious.

SUMMARY

The present application provides an easy-to-install solar surveillance apparatus with low installation difficulty.

An embodiment provides an easy-to-install solar surveillance apparatus. The easy-to-install solar surveillance apparatus includes a mount, a camera device and a solar device. The mount is provided with a first locking slot and a second locking slot. The camera device includes a first locking plate, a first holder and a camera. The solar device includes a second locking plate, a second holder and a solar assembly. The first locking plate and the camera are disposed at one end of the first holder and another end of the first holder respectively. The second locking plate and the solar assembly are disposed at one end of the second holder and another end of the second holder respectively. The first locking plate may be inserted into the first locking slot to secure the camera device. The second locking plate may be inserted into the second locking slot to secure the solar device.

As an optional solution of the easy-to-install solar surveillance apparatus according to the present application, the mount includes a baseplate and two first stopper plates. The two first stopper plates are disposed apart on the surface of the baseplate. One first stopper plate includes a first vertical plate and a first parallel plate. One side of the first vertical plate is connected to the baseplate in a vertical manner. Another side of the first vertical plate opposite to one side is connected to the first parallel plate in a vertical manner. The first parallel plate is parallel to the baseplate. The end face of one side of the first parallel plate of one first stopper plate that faces away from the first vertical plate of the one first stopper plate is opposite to the end face of one side of the first parallel plate of the other first stopper plate that faces away from the first vertical plate of the other first stopper plate. The first locking slot is formed between the first parallel plate and the baseplate.

As an optional solution of the easy-to-install solar surveillance apparatus according to the present application, the first locking plate includes a plate body and two stopper protrusions. The contour of the plate body is rectangular. The two stopper protrusions are each disposed on a respective one of two opposite sides of the plate body. The edge of the plate body may be inserted into the first locking slot to make the two stopper protrusions each abut against the top of a respective first stopper plate.

As an optional solution of the easy-to-install solar surveillance apparatus according to the present application, the first locking plate also includes a connection plate. The connection plate is secured to the top of the plate body. The connection plate is provided with a first through hole. The baseplate is provided with a first threaded hole. The connection plate is configured to be secured to the baseplate by a fastener that threads through the first through hole and is in screwed connection with into the first threaded hole.

As an optional solution of the easy-to-install solar surveillance apparatus according to the present application, the mount also includes two second stopper plates. The two second stopper plates are disposed apart on the surface of the baseplate. One second stopper plate includes a second vertical plate and a second parallel plate. One side of the second vertical plate is connected to the baseplate in a vertical manner. Another side of the second vertical plate opposite to one side is connected to the second parallel plate in a vertical manner. The second parallel plate is parallel to the baseplate. The second locking slot is formed between the second parallel plate and the baseplate. The second vertical plate is L-shaped to enable the second vertical plate to support the second locking plate.

As an optional solution of the easy-to-install solar surveillance apparatus according to the present application, the mount also includes at least one stopper rib. One stopper rib is disposed between the two second stopper plates. The second locking plate is provided with at least one stopper slot. Each stopper rib may be inserted into a respective stopper slot. The second locking plate is provided with a second through hole. The baseplate is provided with a second threaded hole. The second locking plate is configured to be secured to the baseplate by a fastener that threads through the second through hole and is in screwed connection with the second threaded hole.

As an optional solution of the easy-to-install solar surveillance apparatus according to the present application, the solar assembly includes a solar panel, a mounting bracket, a battery pack and a bottom shell. The solar panel covers one side of the mounting bracket. A receiving chamber for receiving the battery pack is disposed in the mounting bracket. The bottom shell is connected to the mounting bracket and covers the receiving chamber. The second holder is connected to the bottom shell.

As an optional solution of the easy-to-install solar surveillance apparatus according to the present application, the camera device also includes a wireless module and an antenna. The first holder and the second holder are each a hollow structure. The wireless module is disposed inside the first holder. The antenna is disposed on the surface of the first holder.

As an optional solution of the easy-to-install solar surveillance apparatus according to the present application, the first holder includes a first connection rod and a mounting base. The first locking plate is disposed at one end of the first connection rod. The mounting base is disposed at another end of the first connection rod. The camera device is disposed on the mounting base. The mounting base includes a mounting base body and a cover. The mounting base is provided with a subscriber identity module (SIM) card slot. The cover is connected to the mounting base body in a detachable manner. The cover can cover the card slot.

As an optional solution of the easy-to-install solar surveillance apparatus according to the present application, the second holder includes a second connection rod, a stationary shaft and a ball holder. One end of the second connection rod is connected to the second locking plate. Another end of the second connection rod is provided with a hemispherical recess. The ball holder includes a holder body and a hemispherical base connected to the holder body. The stationary shaft is disposed inside the hemispherical base. The stationary shaft is connected to the second connection rod through a fastener and makes the hemispherical base be disposed inside the hemispherical recess in a movable manner.

REFERENCE LIST 1 mount
11 baseplate
111 first threaded hole
112 second threaded hole
12 first stopper plate
121 first vertical plate
122 first parallel plate
13 second stopper plate
131 second vertical plate
132 second parallel plate
14 stopper rib
100 first locking slot
200 second locking slot
2 camera device
21 first locking plate
211 plate body
212 stopper rib
213 connection plate
2131 first through hole
22 first holder
221 first connection rod
222 mounting base
2221 mounting base body
22211 SIM card slot
2222 cover
23 camera
24 antenna
3 solar device
31 second locking plate
311 stopper slot
312 second through hole
32 second holder
321 second connection rod
3211 hemispherical recess
3212 third through hole
322 stationary shaft
3221 fourth through hole
323 ball holder
3231 holder body
3232 hemispherical base
32321 fifth through hole
32322 stationary slot
33 solar assembly
331 solar panel
332 mounting bracket
333 battery pack
334 bottom shell

DETAILED DESCRIPTION

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on" the second feature, the first feature is right on or obliquely on the second feature, or the first feature is merely at a higher level than the second feature. When the first feature is described as "below" the second feature, the first feature is right below or obliquely below the second feature, or the first feature is merely at a lower level than the second feature.

Moreover, terms like "first" and "second" are merely for description and are not to be construed as indicating or implying relative importance or implicitly indicating the number of technical features as indicated. Thus, a feature defined as a "first" feature or a "second" feature may explicitly or implicitly include one or more of such features.

Figure 1:
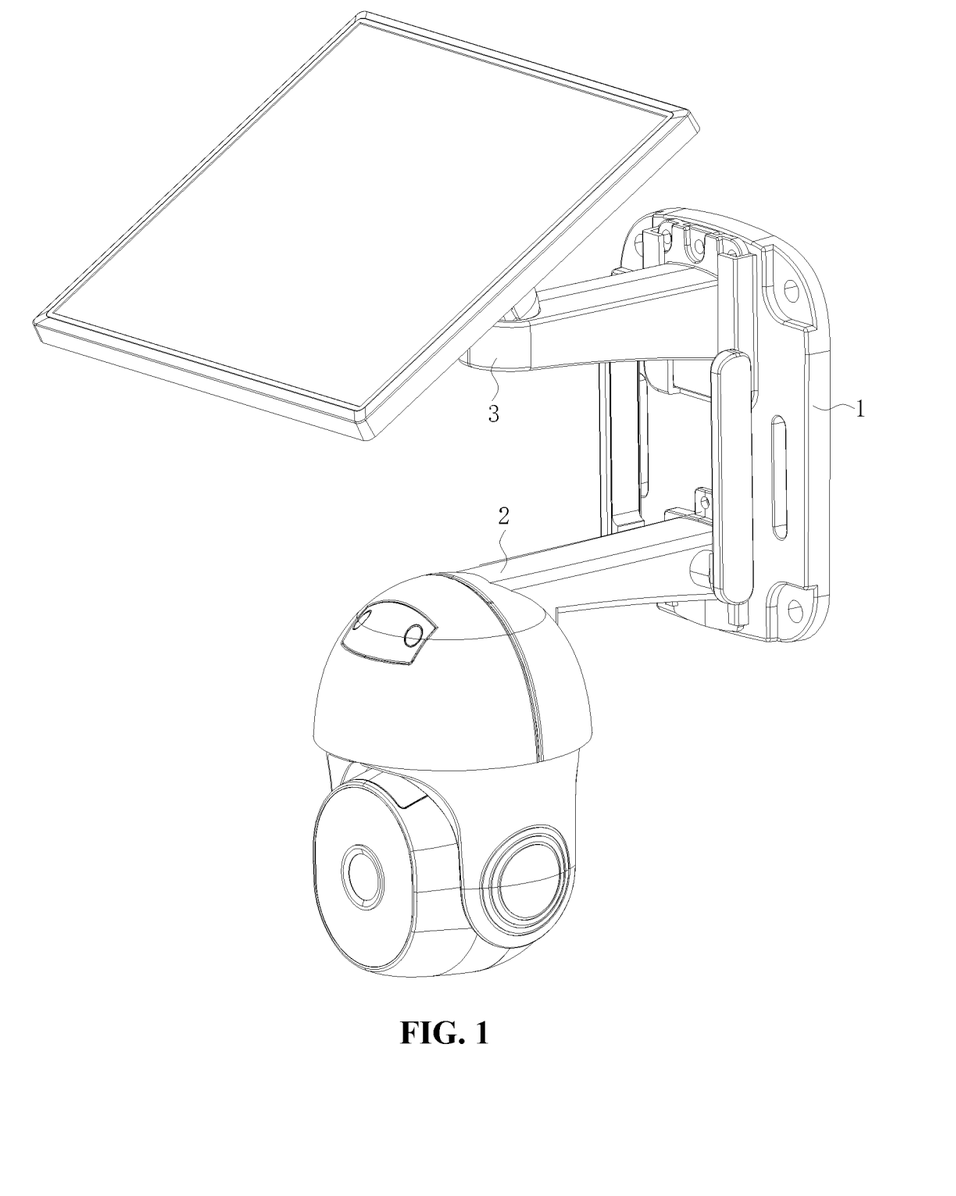
FIG. 1 is a perspective view of an easy-to-install solar surveillance apparatus according to an embodiment of the present application.
Figure 2:
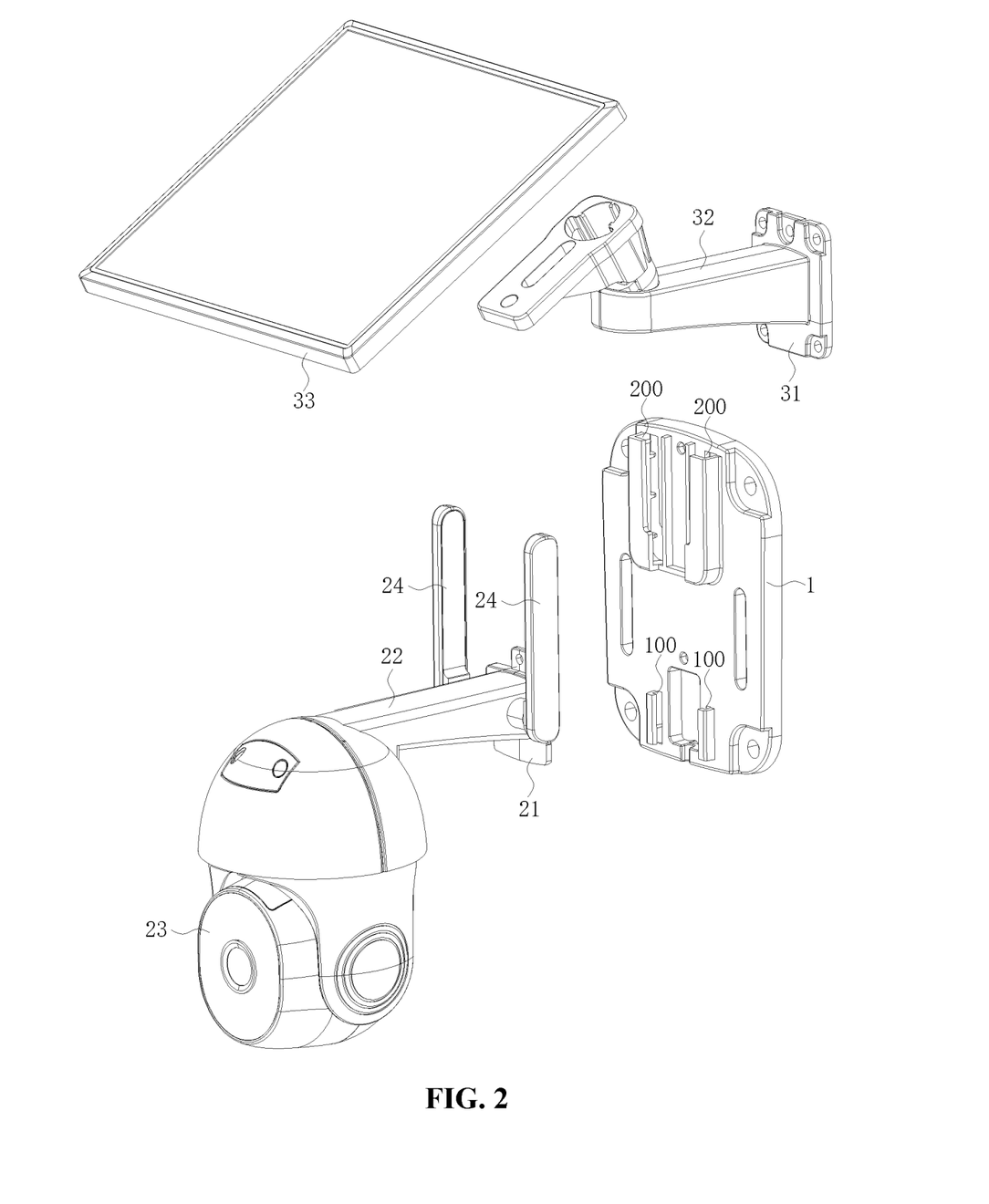
FIG. 2 is an exploded view of FIG. 1.

As shown in FIGS. 1 and 2, an easy-to-install solar surveillance apparatus according to an embodiment includes a mount 1, a camera device 2 and a solar device 3. The mount 1 is provided with a first locking slot 100 and a second locking slot 200. The camera device 2 includes a first locking plate 21, a first holder 22 and a camera 23. The solar device 3 includes a second locking plate 31, a second holder 32 and a solar assembly 33. The first locking plate 21 and the camera 23 are disposed at one end of the first holder 22 and another end of the first holder 22 respectively. The second locking plate 31 and the solar assembly 33 are disposed at one end of the second holder 32 and another end of the second holder 32 respectively. The first locking plate 21 may be inserted into the first locking slot 100 to secure the camera device 2. The second locking plate 31 may be inserted into the second locking slot 200 to secure the solar device 3.

The easy-to-install solar surveillance apparatus according to this embodiment adopts a detachable assembling form. The camera device 2 and the solar device 3 may be installed on the mount 1 respectively after the mount 1 is installed in place. The mount 1 has a light weight and has less difficulty in installation. Therefore, the mount 1 can be installed accurately. The mount 1 is provided with the first locking slot 100 and the second locking slot 200, and the camera device 2 and the solar device 3 are provided with the first locking plate 21 and the second locking plate 21 separately. Therefore, the camera device 2 and the solar device 3 can be positioned quickly and accurately in a direct manner, and complete the fitting work without the help of a tool. As a result, the difficulty of the installation is reduced, and the accuracy of the installation is improved.

Figure 3:
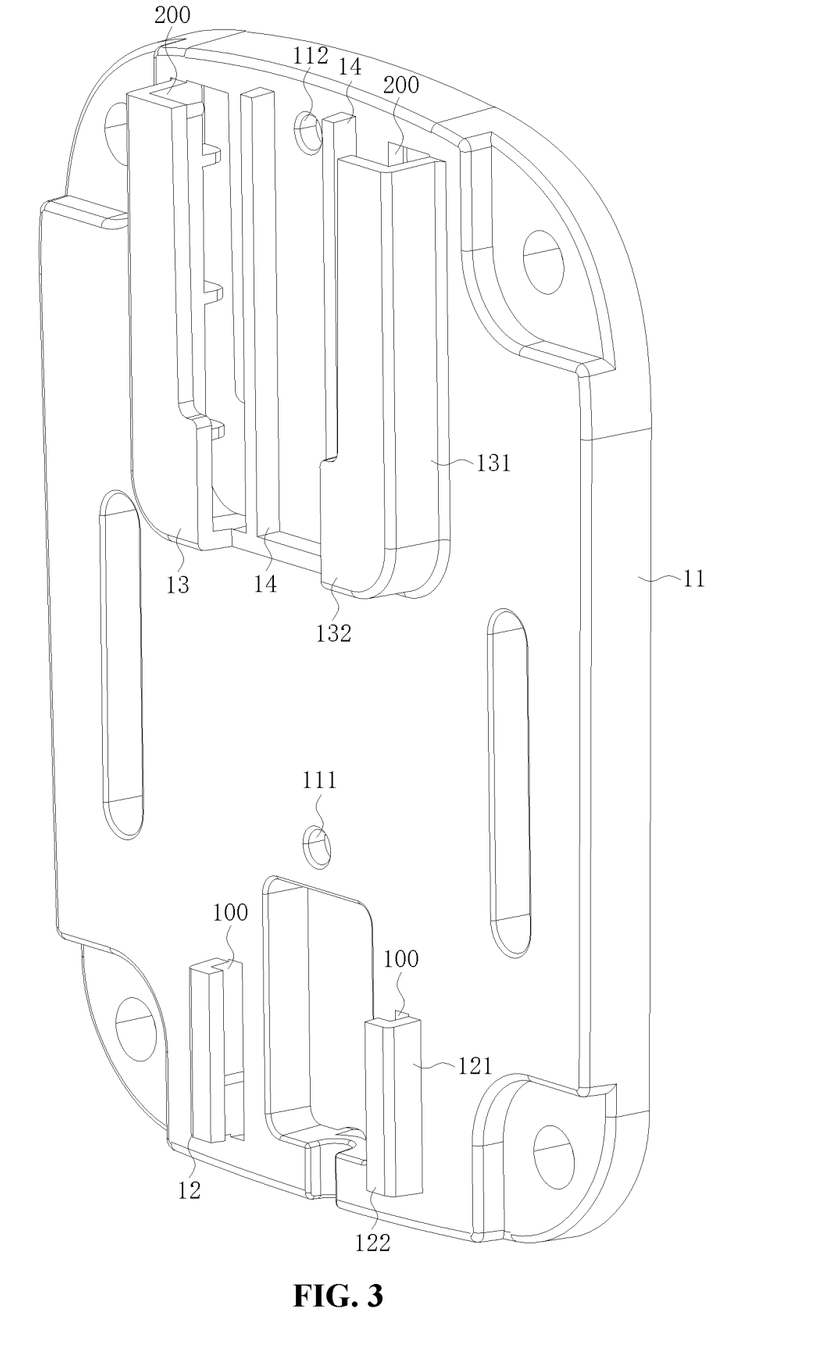
FIG. 3 is an enlarged view of a mount in FIG. 2.

As shown in FIG. 3, optionally, the mount 1 includes a baseplate 11 and two first stopper plates 12. The two first stopper plates 12 are disposed apart on the surface of the baseplate 11. Each first stopper plate 12 includes a first vertical plate 121 and a first parallel plate 122. One side of the first vertical plate 121 is connected to the baseplate 11 in a vertical manner. Another side of the first vertical plate 121 opposite to the one side is connected to the first parallel plate 122 in a vertical manner. The first parallel plate 122 is parallel to the baseplate 11. The end face of one side of the first parallel plate 122 of one first stopper plate 12 that faces away from the first vertical plate 121 of the one first stopper plate 12 is opposite to the end face of one side of the first parallel plate 122 of the other first stopper plate 12 that faces away from the first vertical plate 121 of the other first stopper plate 12. The first locking slot 100 is formed between the first parallel plate 122 and the baseplate 11. This structure of the first stopper plate 12 is simple, and the manufacturing cost is low. The spacing between the first parallel plate 122 and the baseplate 11 may be configured to be slightly larger than the thickness of the first locking plate 21, and the spacing between the two first vertical plates 121 is configured to be slightly larger than the width of the first locking plate 21. In this manner, the first locking plate 21 can be easily inserted into the first locking slot 100, and after the first locking plate 21 is inserted in place, the first locking plate 21 does not shake significantly in the first locking slot 100.

Figure 4:
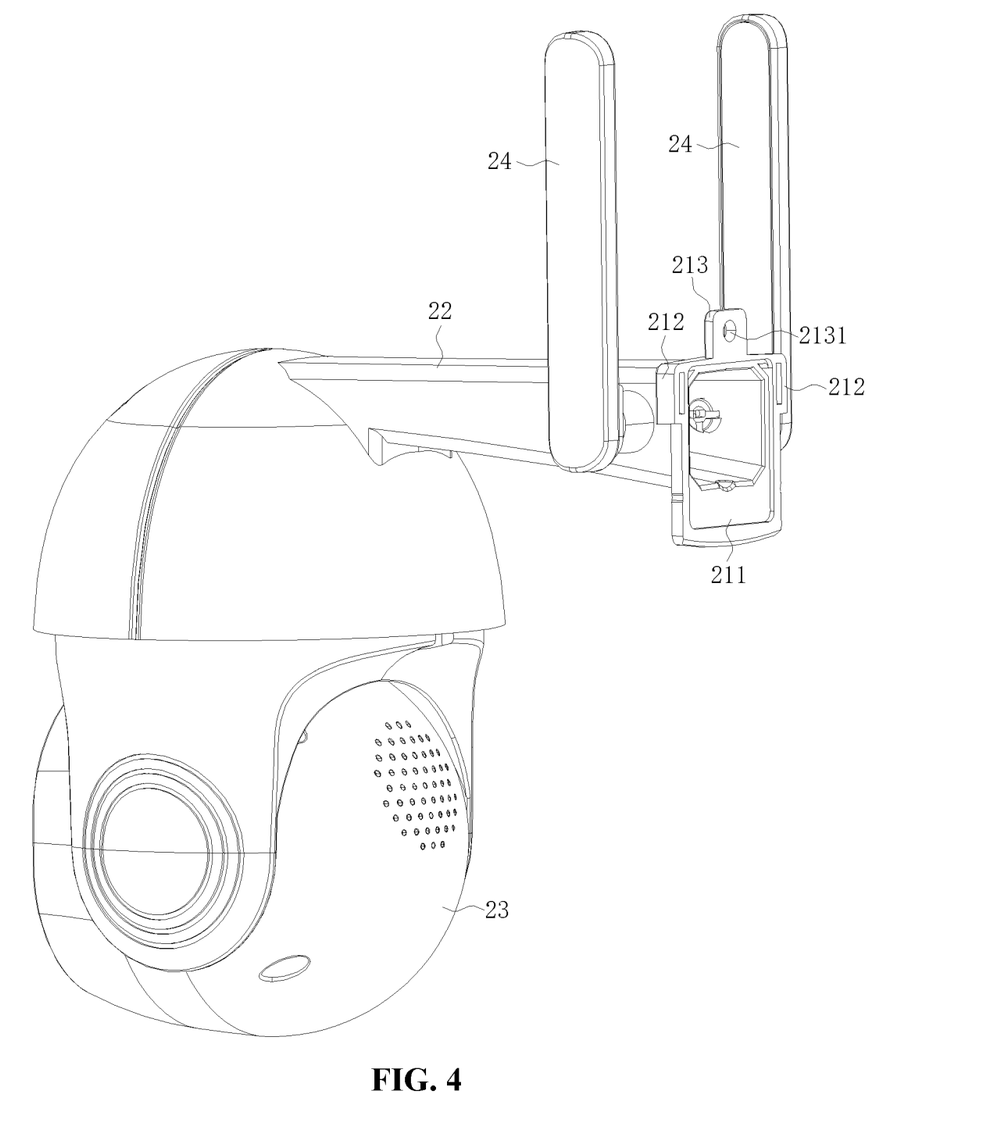
FIG. 4 is a perspective view of a camera device in FIG. 2.

As shown in FIG. 4, the first locking plate 21 includes a plate body 211 and two stopper protrusions 212. The contour of the plate body 211 is rectangular. The two stopper protrusions 212 are each disposed on a respective one of two opposite sides of the plate body 211. The edge of the plate body 211 may be inserted into the first locking slot 100 to make the two stopper protrusion 212 each abut against the top of a respective first stopper plate 12. In this embodiment, the first vertical plate 121 and the first parallel plate 122 are each a flat-plate structure, and two ends of the first locking slot 100 are open. Therefore, with the consideration of the general installation posture of the mount 1, that is, the mount 1 is usually secured to a wall surface, one stopper protrusion 212 needs to be disposed to prevent the first locking plate 21 from falling out of the first locking slot 100 due to gravity.

As shown in FIGS. 3 and 4, the first locking plate 21 also includes a connection plate 213. The connection plate 213 is secured to the top of the plate body 211. The connection plate 213 is provided with a first through hole 2131. The baseplate 11 is provided with a first threaded hole 111. The connection plate 213 is secured to the baseplate 11 by a fastener (not shown in the figure) that threads through the first through hole 2131 and is in screwed connection with the first threaded hole 111. Although the stopper protrusion 212 may secure the camera device 2 on the mount 1 well, under the action of an external force, the first locking plate 21 can still be displaced in the first locking slot 100. As a result, the camera device 2 is separated from the mount 1. The connection plate 213 is configured to be secured to the baseplate 11 with a fastener (such as a screw) to prevent the first locking plate 21 from being displaced. In this manner, the stability of the camera device 2 is improved, and the imaging device 2 is prevented from being separated from the mount 1 in an unexpected case. In addition, due to the improvement of the stability, the camera 23 is not prone to shake. Therefore, a surveillance image can also be maintained in a relatively stable state.

As shown in FIG. 3, in this embodiment, the mount 1 also includes two second stopper plates 13. The two second stopper plates 13 are disposed apart on the surface of the baseplate 11. Each second stopper plate 13 includes a second vertical plate 131 and a second parallel plate 132. One side of the second vertical plate 131 is connected to the baseplate 11 in a vertical manner. Another side of the second vertical plate 131 opposite to the one side is connected to the second parallel plate 132 in a vertical manner. The second parallel plate 132 is parallel to the baseplate 11. The second locking slot 200 is formed between the second parallel plate 132 and the baseplate 11. The second vertical plate 131 is L-shaped to enable the second vertical plate 131 to support the second locking plate 31. Different from the first vertical plate 121, the second vertical plate 131 is L-shaped. Therefore, after the second locking plate 31 is inserted into the second locking slot 200, the second vertical plate 131 can hold the second locking plate 31 and serves as a stopper to prevent the second locking plate 31 from continuing to move.

Figure 5:
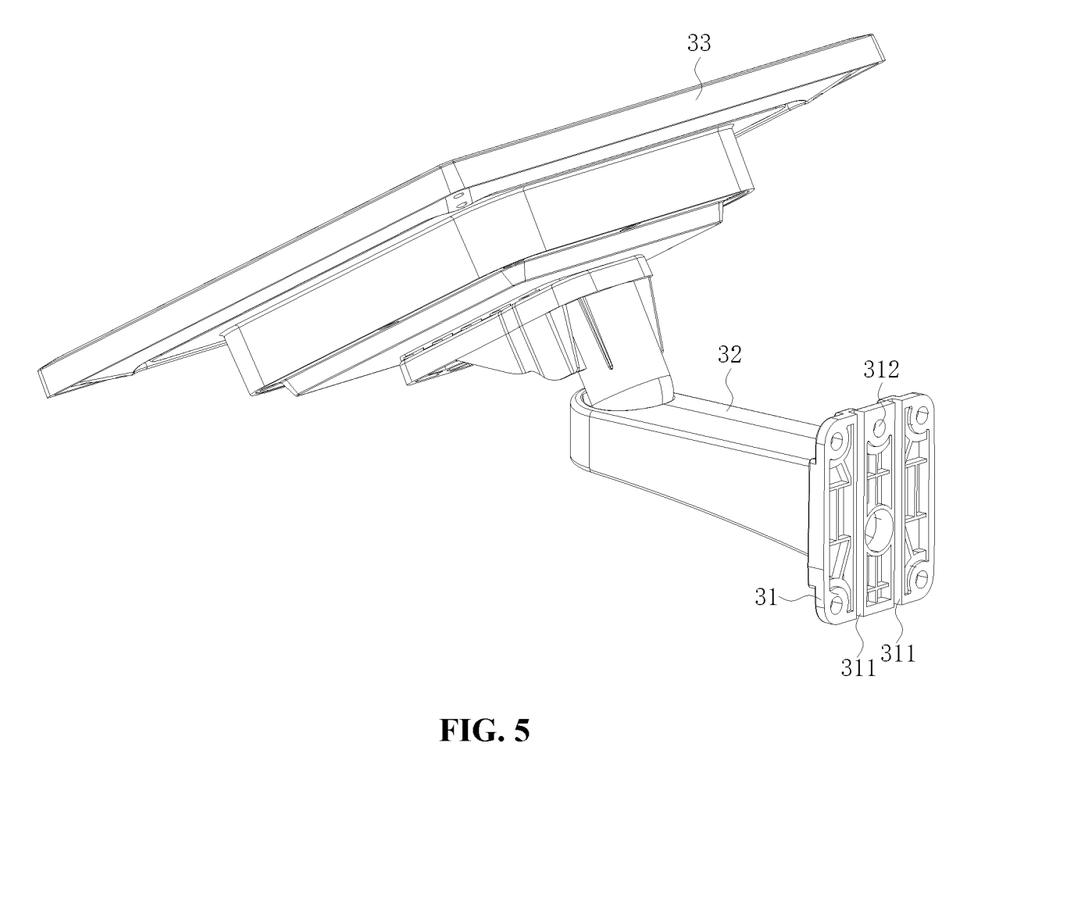
FIG. 5 is a perspective view of a solar device in FIG. 2.

Optionally, the mount 1 according to this embodiment also includes two second stopper plates 14. The two stopper ribs 14 are disposed between the two second stopper plates 13. As shown in FIG. 5, the second locking plate 3 is provided with two stopper slots 311. Each stopper rib 14 may be inserted into a respective stopper slot 311. The number of stopper ribs 14 and the number of stopper slots 311 are each at least one. In this embodiment, optionally, the number of the stopper ribs 14 and the number of the stopper slots 311 may be each two. The weight of the solar device 3 may be heavy. Therefore, there is a higher requirement for the stability of the connection between the second locking plate 31 and the mount 1. The cooperation between the stopper rib 14 and the stopper slot 311 can enhance the stability of the connection between the second locking plate 31 and the mount 1.

As shown in FIG. 5, the second locking plate 31 is provided with a second through hole 312. As shown in FIG. 3, the baseplate 11 is provided with a first threaded hole 112. The second locking plate 31 is secured to the baseplate 11 by a fastener (not shown in the figure) that threads through the second through hole 312 and is in screwed connection with the second threaded hole 112. Therefore, the second locking plate 31 may be locked on the mount 1. Even if the solar device 3 is accidentally subjected to an external force, the solar device 3 is not prone to separate from the mount 1.

Optionally, the first holder 22 and the second holder 32 are each a hollow structure. A channel for a wire rod to thread through is formed inside the first holder 22 and the second holder 32. Both the camera device 2 and the solar device 3 need to be connected with the wire rod to implement data transmission or power supply. In the case where the wire rod is disposed inside the first holder 22 and the second holder 32, not only the appearance is more beautiful, but also the aging of the wire rod is delayed. As a result, the service life of the wire rod is prolonged.

As shown in FIG. 4, the camera device 2 of this embodiment also includes a wireless module (not shown in the figure) and an antenna 24. The wireless module is disposed inside the first holder 22. The antenna 24 is disposed on the surface of the first holder 22. Therefore, the wireless transmission function of the data and the wireless control function of the data can be implemented. There are two antennas 24 in this embodiment. One antenna 24 may be configured to transmit and receive a wireless fidelity (WIFI) signal, and another antenna 24 may be configured to transmit and receive a fourth-generation (4G) or fifth-generation (5G) signal. Even if the transmission and the reception of one of the signals fail, the normal operation of the equipment can be implemented through the other signal.

Figure 6:
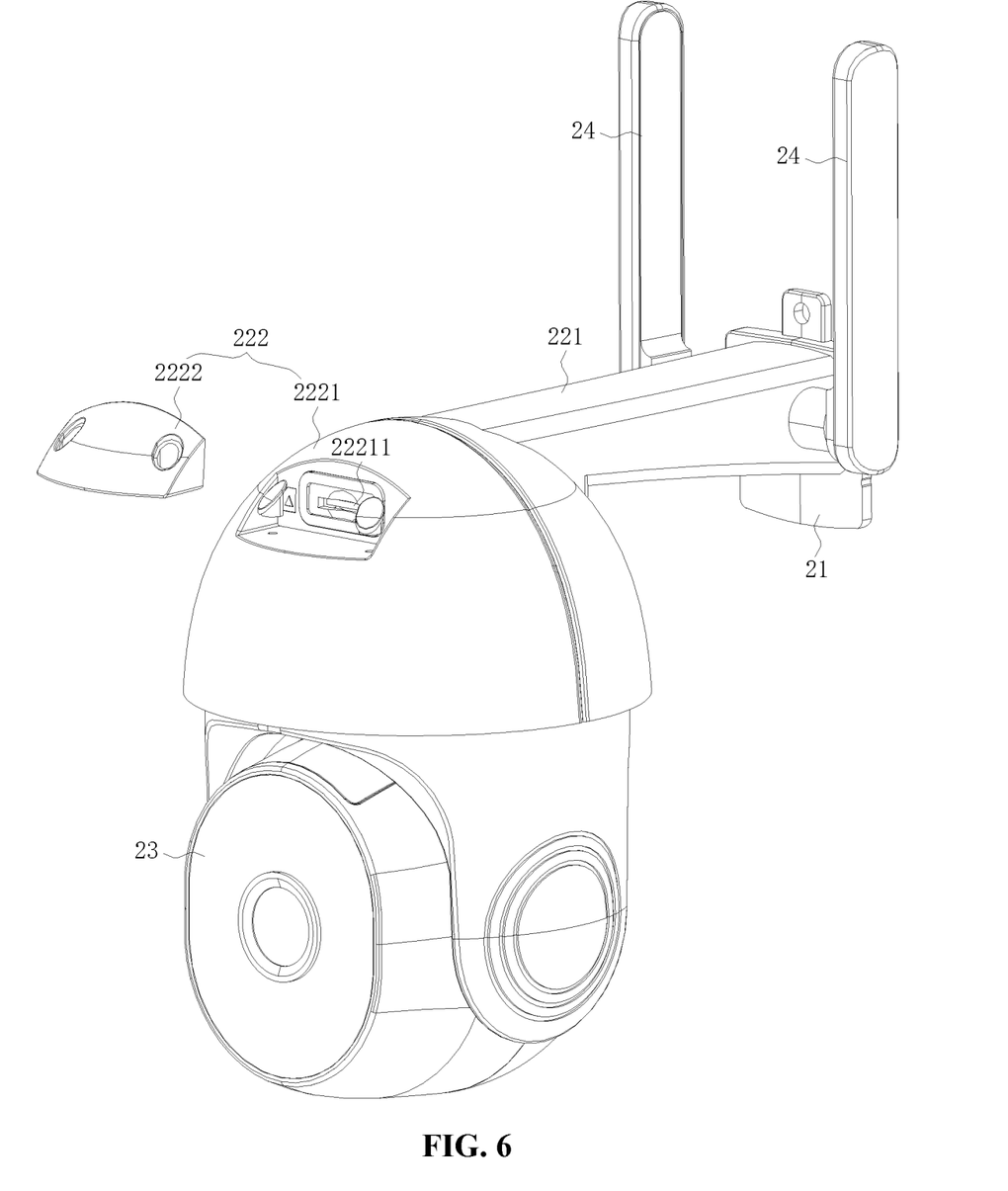
FIG. 6 is an exploded view of a camera device according to an embodiment of the present application.

As shown in FIG. 6, in an embodiment, the first holder 22 includes a first connection rod 221 and a mounting base 222. The first locking plate 21 is disposed at one end of the first connection rod 221. The mounting base 222 is disposed at another end of the first connection rod 221. The camera device 23 is disposed on the mounting base 222. The antenna 24 is disposed on the first connection rod 221. The mounting base 222 includes a mounting base body 2221 and a cover 2222. The mounting base 2221 is provided with a SIM card slot 22211. The cover 2222 is connected to the mounting base body 2221 in a detachable manner. The cover 2222 can cover the card slot 22211. When the 4G signal or the 5G signal needs to be transmitted and received, a SIM card needs to be inserted into the SIM card slot 22211. The cover 2222 can cover the SIM card slot 22211 and the SIM card to protect the SIM card and prevent the SIM card from being damaged.

Figure 7:
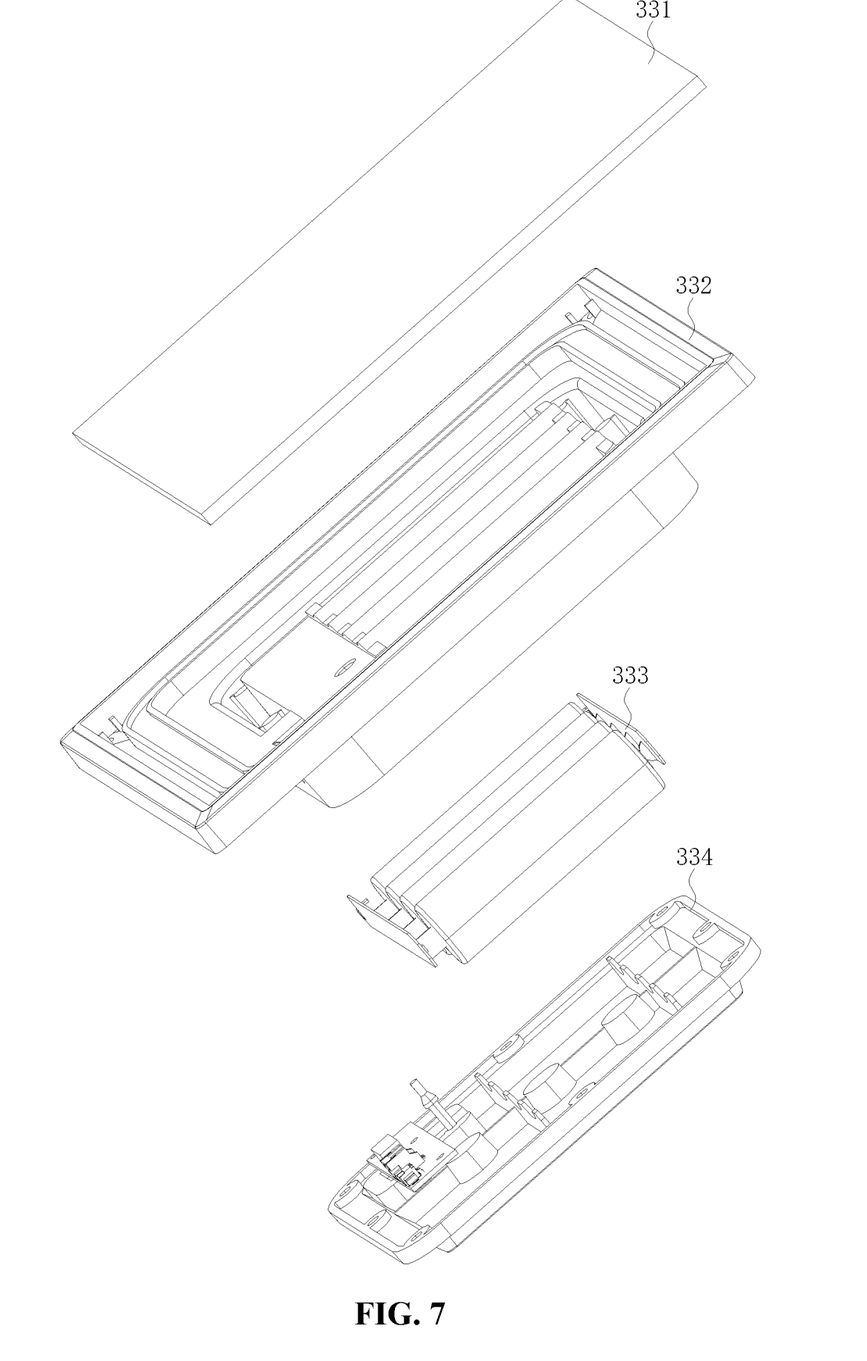
FIG. 7 is an exploded view of a solar assembly according to an embodiment of the present application.

As shown in FIG. 7, optionally, the solar device 3 includes a solar panel 331, a mounting bracket 332, a battery pack 333 and a bottom shell 334. The solar panel 331 covers one side of the mounting bracket 332. A receiving chamber (not shown in the figure) for receiving the battery pack 333 is disposed in the mounting bracket 332. The bottom shell 334 is connected to the mounting bracket 332 and covers the receiving chamber. The second holder 32 is connected to the bottom shell 334. The battery pack 333 adopts a secondary battery. The battery pack 333 itself can provide a certain endurance time. When the solar panel 331 can receive sufficient light, the battery pack 333 may be charged. In this manner, the solar device 3 has long endurance time. When the solar device 3 fails and needs maintenance, the damaged solar device 3 may be detached and replaced with a new solar device 3 to minimize the surveillance blank period due to a component failure.

Figure 8:
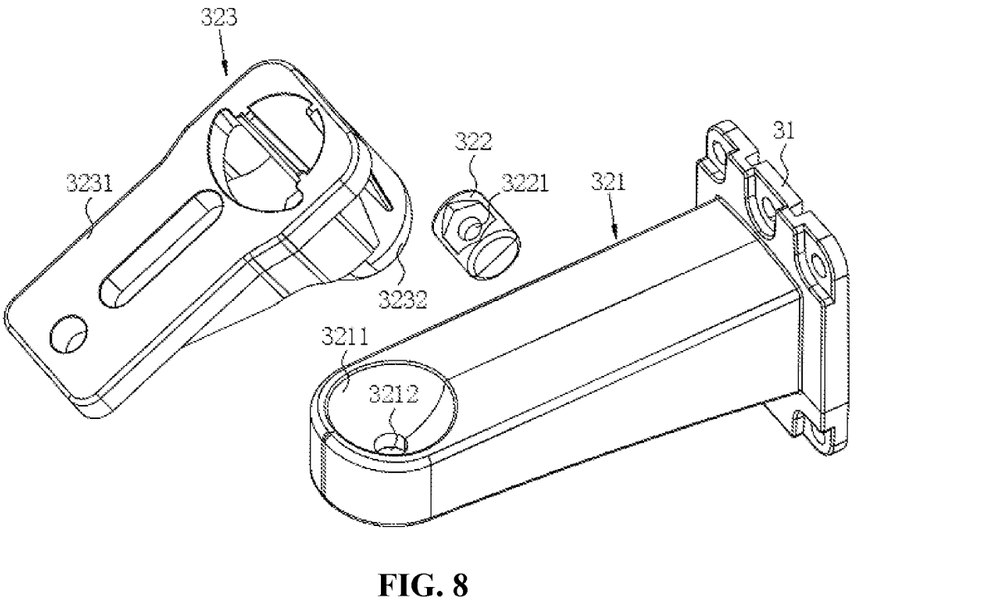
FIG. 8 is an exploded view of a second holder according to an embodiment of the present application.
Figure 9:
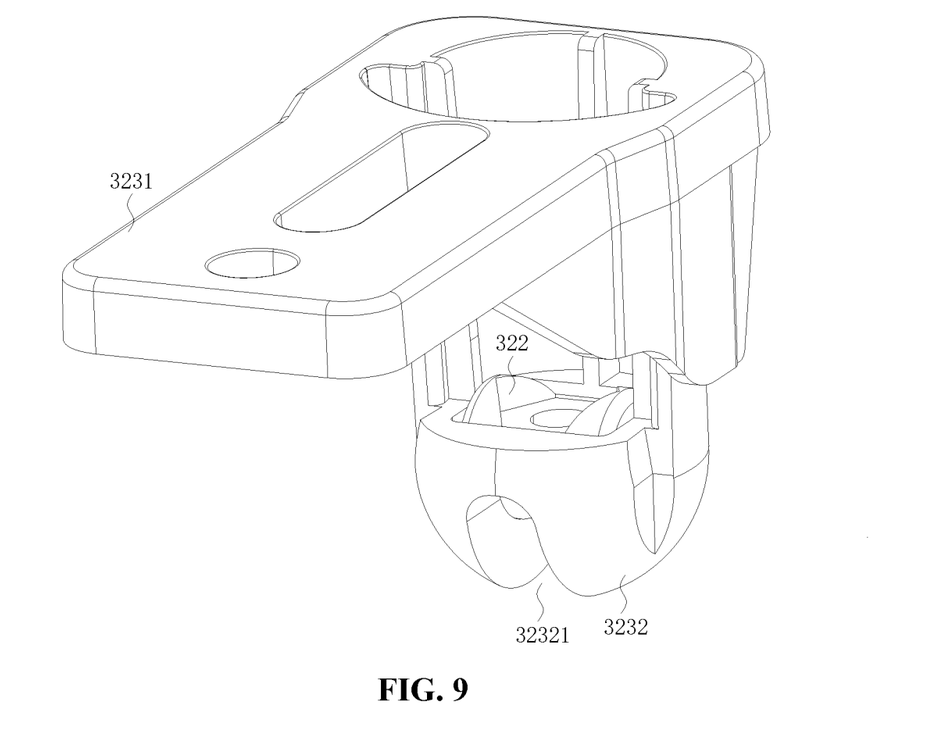
FIG. 9 is a perspective view of a ball holder and a stationary shaft that are fit together according to an embodiment of the present application.
Figure 10:
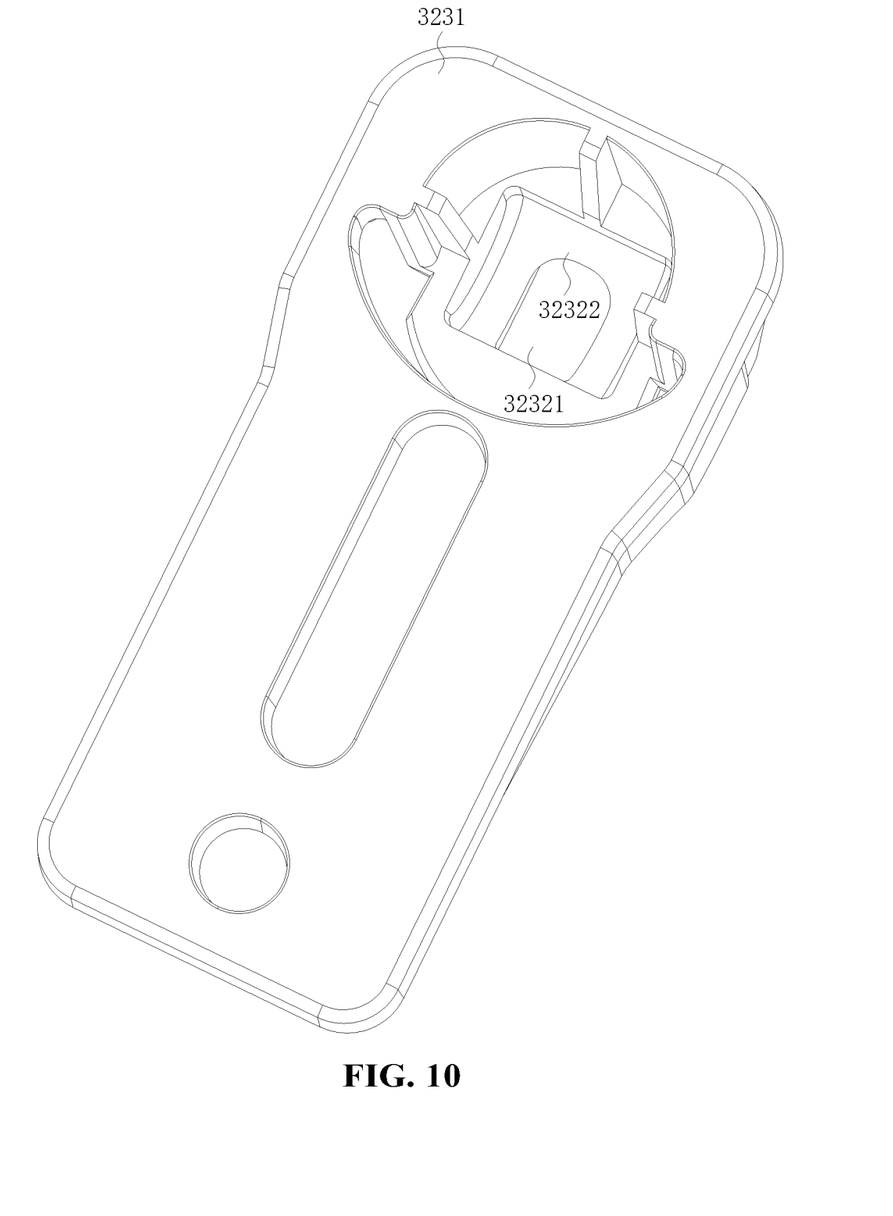
FIG. 10 is a perspective view of the ball holder of FIG. 9 from another angle.

As shown in FIGS. 8 to 10, in an embodiment, the second holder 32 includes a second connection rod 321, a stationary shaft 322 and a ball holder 323. One end of the second connection rod 321 is connected to the second locking plate 31. Another end of the second connection rod 321 is provided with a hemispherical recess 3211. The ball holder 323 includes a holder body 3231 and a hemispherical base 3232 connected to the holder body 3231. The stationary shaft 322 is disposed inside the hemispherical base 3232. The stationary shaft 322 is connected to the second connection rod 321 through a fastener and makes the hemispherical base 3232 be disposed inside the hemispherical recess 3211 in a movable manner.

The hemispherical base 3232 is provided with a stationary slot 32322. The stationary shaft 322 is disposed in the stationary slot 32322. The slot bottom of the hemispherical recess 3211 is provided with a third through hole 3212. The stationary shaft 322 is provided with a fourth through hole 3221. The hemispherical base 3232 is provided with a fifth through hole 32321. A fastener (such as a screw) threads through the third through hole 3212, the fourth through hole 3221 and the fifth through hole 32321. In this manner, the ball holder 323 is connected to the second connection rod 321, and the hemispherical base 3232 may rotate in the hemispherical recess 3211. Therefore, the ball holder 323 implements a pitch adjustment and a rotation adjustment in a horizontal plane. When the pitch adjustment of the ball holder 323 is performed, the relative rotation may also occur between the hemispherical base 3232 and the stationary shaft 322, and the fastener may hinder the pitch adjustment of the ball holder 323. To make the ball holder 323 perform the pitch adjustment within a large angle range, the dimension of the fifth through hole 32321 is large. Therefore, the orientation of the solar panel 331 can be greatly adjusted to make a corresponding adjustment according to different installation environments. As a result, the sunshine time can be used to the maximum extent to make the power supply sufficient.

As an optional implementation of the present application, in the description of the specification, the description of reference terms "preferably", "further" means that a specific feature, structure, material, or characteristic described in connection with the embodiment or the example is included in at least one embodiment or example of the present application. In the specification, the illustrative description of the preceding terms does not necessarily refer to the same embodiment or example. Moreover, the described specific feature, structure, material or characteristic may be combined in an appropriate manner in any one or more embodiments or examples.

What is claimed is:

1. An easy-to-install solar surveillance apparatus, comprising a mount, a camera device and a solar device, wherein the mount is provided with a first locking slot and a second locking slot, the camera device comprises a first locking plate, a first holder and a camera, the solar device comprises a second locking plate, a second holder and a solar assembly, the first locking plate and the camera are disposed at one end of the first holder and another end of the first holder respectively, the second locking plate and the solar assembly are disposed at one end of the second holder and another end of the second holder respectively, the first locking plate is configured to be inserted into the first locking slot to secure the camera device, and the second locking plate is configured to be inserted into the second locking slot to secure the solar device.

2. The easy-to-install solar surveillance apparatus according to claim 1, wherein the mount comprises a baseplate and two first stopper plates, the two first stopper plates are disposed apart on a surface of the baseplate, each of the two first stopper plates comprises a first vertical plate and a first parallel plate, one side of the first vertical plate is connected to the baseplate in a vertical manner, another side of the first vertical plate opposite to the one side of the first vertical plate is connected to the first parallel plate in the vertical manner, the first parallel plate is parallel to the baseplate, an end face of one side of a first parallel plate of one of the two first stopper plates that faces away from a first vertical plate of the one of the two first stopper plates is opposite to an end face of one side of a first parallel plate of the other one of the two first stopper plates that faces away from a first vertical plate of the other one of the two first stopper plates, and the first locking slot is formed between the first parallel plate and the baseplate.

3. The easy-to-install solar surveillance apparatus according to claim 2, wherein the first locking plate comprises a plate body and two stopper protrusions, a contour of the plate body is rectangular, the two stopper protrusions are each disposed on a respective one of two opposite sides of the plate body, and an edge of the plate body is configured to be inserted into the first locking slot to make the two stopper protrusions each abut against a top of a respective one of the two first stopper plates.

4. The easy-to-install solar surveillance apparatus according to claim 3, wherein the first locking plate further comprises a connection plate, the connection plate is secured to a top of the plate body, the connection plate is provided with a first through hole, the baseplate is provided with a first threaded hole, and the connection plate is configured to be secured to the baseplate by a fastener that threads through the first through hole and is in screwed connection with the first threaded hole.

5. The easy-to-install solar surveillance apparatus according to claim 2, wherein the mount further comprises two second stopper plates, the two second stopper plates are disposed apart on the surface of the baseplate, each of the two second stopper plates comprises a second vertical plate and a second parallel plate, one side of the second vertical plate is connected to the baseplate in the vertical manner, another side of the second vertical plate opposite to the one side of the second vertical plate is connected to the second parallel plate in the vertical manner, the second parallel plate is parallel to the baseplate, the second locking slot is formed between the second parallel plate and the baseplate, and the second vertical plate is L-shaped to enable the second vertical plate to support the second locking plate.

6. The easy-to-install solar surveillance apparatus according to claim 5, wherein the mount further comprises at least one stopper rib, the at least one stopper rib is disposed between the two second stopper plates, the second locking plate is provided with at least one stopper slot, each of the at least one stopper rib is configured to be inserted into a respective one of the at least one stopper slot, the second locking plate is provided with a second through hole, the baseplate is provided with a second threaded hole, and the second locking plate is configured to be secured to the baseplate by a fastener that threads through the second through hole and is in screwed connection with the second threaded hole.

7. The easy-to-install solar surveillance apparatus according to claim 1, wherein the solar assembly comprises a solar panel, a mounting bracket, a battery pack and a bottom shell, the solar panel covers one side of the mounting bracket, a receiving chamber for receiving the battery pack is disposed in the mounting bracket, the bottom shell is connected to the mounting bracket and covers the receiving chamber, and the second holder is connected to the bottom shell.

8. The easy-to-install solar surveillance apparatus according to claim 1, wherein the camera device further comprises a wireless module and an antenna, the first holder and the second holder are each a hollow structure, the wireless module is disposed inside the first holder, and the antenna is disposed on a surface of the first holder.

9. The easy-to-install solar surveillance apparatus according to claim 1, wherein the first holder comprises a first connection rod and a mounting base, the first locking plate is disposed at one end of the first connection rod, the mounting base is disposed at another end of the first connection rod, the camera is disposed on the mounting base, the mounting base comprises a mounting base body and a cover, the mounting base body is provided with a subscriber identity module (SIM) card slot, the cover is connected to the mounting base body in a detachable manner, and the cover is configured to cover the card slot.

10. The easy-to-install solar surveillance apparatus according to claim 1, wherein the second holder comprises a second connection rod, a stationary shaft and a ball holder, one end of the second connection rod is connected to the second locking plate, another end of the second connection rod is provided with a hemispherical recess, the ball holder comprises a holder body and a hemispherical base connected to the holder body, the stationary shaft is disposed inside the hemispherical base, and the stationary shaft is connected to the second connection rod through a fastener and makes the hemispherical base disposed inside the hemispherical recess in a movable manner.

11. The easy-to-install solar surveillance apparatus according to claim 2, wherein the solar assembly comprises a solar panel, a mounting bracket, a battery pack and a bottom shell, the solar panel covers one side of the mounting bracket, a receiving chamber for receiving the battery pack is disposed in the mounting bracket, the bottom shell is connected to the mounting bracket and covers the receiving chamber, and the second holder is connected to the bottom shell.

12. The easy-to-install solar surveillance apparatus according to claim 3, wherein the solar assembly comprises a solar panel, a mounting bracket, a battery pack and a bottom shell, the solar panel covers one side of the mounting bracket, a receiving chamber for receiving the battery pack is disposed in the mounting bracket, the bottom shell is connected to the mounting bracket and covers the receiving chamber, and the second holder is connected to the bottom shell.

13. The easy-to-install solar surveillance apparatus according to claim 4, wherein the solar assembly comprises a solar panel, a mounting bracket, a battery pack and a bottom shell, the solar panel covers one side of the mounting bracket, a receiving chamber for receiving the battery pack is disposed in the mounting bracket, the bottom shell is connected to the mounting bracket and covers the receiving chamber, and the second holder is connected to the bottom shell.

14. The easy-to-install solar surveillance apparatus according to claim 5, wherein the solar assembly comprises a solar panel, a mounting bracket, a battery pack and a bottom shell, the solar panel covers one side of the mounting bracket, a receiving chamber for receiving the battery pack is disposed in the mounting bracket, the bottom shell is connected to the mounting bracket and covers the receiving chamber, and the second holder is connected to the bottom shell.

15. The easy-to-install solar surveillance apparatus according to claim 6, wherein the solar assembly comprises a solar panel, a mounting bracket, a battery pack and a bottom shell, the solar panel covers one side of the mounting bracket, a receiving chamber for receiving the battery pack is disposed in the mounting bracket, the bottom shell is connected to the mounting bracket and covers the receiving chamber, and the second holder is connected to the bottom shell.

16. The easy-to-install solar surveillance apparatus according to claim 2, wherein the camera device further comprises a wireless module and an antenna, the first holder and the second holder are each a hollow structure, the wireless module is disposed inside the first holder, and the antenna is disposed on a surface of the first holder.

17. The easy-to-install solar surveillance apparatus according to claim 3, wherein the camera device further comprises a wireless module and an antenna, the first holder and the second holder are each a hollow structure, the wireless module is disposed inside the first holder, and the antenna is disposed on a surface of the first holder.

18. The easy-to-install solar surveillance apparatus according to claim 4, wherein the camera device further comprises a wireless module and an antenna, the first holder and the second holder are each a hollow structure, the wireless module is disposed inside the first holder, and the antenna is disposed on a surface of the first holder.

19. The easy-to-install solar surveillance apparatus according to claim 5, wherein the camera device further comprises a wireless module and an antenna, the first holder and the second holder are each a hollow structure, the wireless module is disposed inside the first holder, and the antenna is disposed on a surface of the first holder.

20. The easy-to-install solar surveillance apparatus according to claim 6, wherein the camera device further comprises a wireless module and an antenna, the first holder and the second holder are each a hollow structure, the wireless module is disposed inside the first holder, and the antenna is disposed on a surface of the first holder.

* * * * *